US012789441B2

(12) United States Patent
Minemura et al.

(10) Patent No.: US 12,789,441 B2
(45) Date of Patent: Nov. 10, 2026

(54) PRODUCTION METHOD AND PRODUCTION DEVICE FOR RESIN CONTAINER

(71) Applicant: NISSEI ASB MACHINE CO., LTD., Nagano (JP)

(72) Inventors: Ryo Minemura, Nagano (JP); Manabu Ogihara, Nagano (JP); Masayuki Usami, Nagano (JP); Junji Takahashi, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 147 days.

(21) Appl. No.: 18/286,867

(22) PCT Filed: Apr. 13, 2022

(86) PCT No.: PCT/JP2022/017736
§ 371 (c)(1),
(2) Date: Oct. 13, 2023

(87) PCT Pub. No.: WO2022/220270
PCT Pub. Date: Oct. 20, 2022

(65) Prior Publication Data

US 2024/0140015 A1 May 2, 2024

(30) Foreign Application Priority Data

Apr. 16, 2021 (JP) ................................ 2021-069717

(51) Int. Cl.
*B29C 49/18* (2006.01)
*B29C 49/06* (2006.01)
(Continued)

(52) U.S. Cl.
CPC .............. *B29C 49/18* (2013.01); *B29C 49/06* (2013.01); *B29C 2049/023* (2013.01); *B29C 2049/6606* (2022.05); *B29L 2031/7158* (2013.01)

(58) Field of Classification Search
CPC ............ B29C 49/071; B29C 2949/072; B29C 49/6445; B29C 49/18
See application file for complete search history.

(56) References Cited

U.S. PATENT DOCUMENTS 3,892,829 A 7/1975 Uhlig
4,550,007 A * 10/1985 Ohtsu ..................... B29C 49/12 264/530

(Continued)

FOREIGN PATENT DOCUMENTS

CN 110225811 A 9/2019
JP S 54-159471 A 12/1979

(Continued)

OTHER PUBLICATIONS

International Search Report issued Jun. 7, 2022 in International Bureau of WIPO Patent Application No. PCT/JP2022/017736 with an English translation thereof.

(Continued)

*Primary Examiner* — Alison L Hindenlang
*Assistant Examiner* — Debjani Roy
(74) *Attorney, Agent, or Firm* — GREENBLUM & BERNSTEIN, P.L.C.

(57) ABSTRACT

A method of manufacturing a resin container having a flat cross-sectional shape includes a temperature adjusting step of preliminarily blowing a resin preform in a first mold to mold an intermediate molded body having a diameter larger than a diameter of a container short diameter side and adjusting a temperature of the intermediate molded body in (Continued)

the first mold, and a blow molding step of bringing the temperature-adjusted intermediate molded body into contact with a second mold to compress the intermediate molded body in a container short diameter direction, and then stretching and blow molding the intermediate molded body in the second mold to manufacture the resin container.

3 Claims, 9 Drawing Sheets

(51) Int. Cl.

| | |
|---|---|
| *B29C 49/02* | (2006.01) |
| *B29C 49/64* | (2006.01) |
| *B29L 31/00* | (2006.01) |

(56) References Cited

U.S. PATENT DOCUMENTS

| | | | | | |
|---|---|---|---|---|---|
| 4,724,116 | A * | 2/1988 | Aoki | B29C 49/071 264/537 |
| 4,900,504 | A | 2/1990 | Fischer | |
| 5,352,402 | A * | 10/1994 | Orimoto | B29C 49/642 264/235 |
| 11,260,575 | B2 | 3/2022 | Kawamura et al. | |
| 11,850,788 | B2 | 12/2023 | Tsuchiya et al. | |
| 2009/0130352 | A1 * | 5/2009 | Komiya | B29C 49/4242 428/34.1 |
| 2019/0337218 | A1 | 11/2019 | Kawamura et al. | |
| 2022/0134629 | A1 | 5/2022 | Ozaki | |
| 2022/0143897 | A1 | 5/2022 | Kawamura et al. | |
| 2022/0347912 | A1 | 11/2022 | Horigome et al. | |
| 2026/0124800 | A1 | 5/2026 | Kawamura et al. | |

FOREIGN PATENT DOCUMENTS

| | | | | | |
|---|---|---|---|---|---|
| JP | S 59-115816 | A | | 7/1984 | |
| JP | H05185493 | A | * | 7/1993 | B29C 45/7207 |
| JP | 9-76338 | A | | 3/1997 | |
| JP | 2000-127230 | A | | 5/2000 | |
| JP | 2005-081641 | A | | 3/2005 | |
| JP | 5567310 | B2 | | 8/2014 | |
| JP | 2019-130250 | A | | 8/2019 | |
| JP | 2020-97229 | A1 | | 6/2020 | |
| JP | 2021-54068 | A1 | | 4/2021 | |
| WO | 2020/171160 | A1 | | 8/2020 | |
| WO | 2021/054403 | A1 | | 3/2021 | |

OTHER PUBLICATIONS

Written Opinion issued Jun. 7, 2022 in International Bureau of WIPO Patent Application No. PCT/JP2022/017736 with an English translation thereof.

Office Action, dated Jul. 31, 2026 in Chinese family member application No. 202280039746.6 with English language translation thereof.

* cited by examiner

PRODUCTION METHOD AND PRODUCTION DEVICE FOR RESIN CONTAINER

BACKGROUND OF THE INVENTION

Field of the Invention

The present invention relates to a method and an apparatus of manufacturing a resin container.

Description of the Related Art

In the related art, there has been known a flat container made of resin in which a cross section of a body portion has a non-circular shape such as an elliptical shape or a rectangular shape. As a method of manufacturing this type of flat container, for example, an extrusion blow molding method or a stretch blow molding method can be used.

A container manufactured by the extrusion blow molding method is generally inferior to a container manufactured by the stretch blow molding method in terms of an aesthetic appearance, dimensional accuracy, and the like. In addition, according to the extrusion blow molding method, a post-process such as cutting of a burr remaining in the container after blow molding and trimming of the cut surface is required, and the amount of resin to be discarded is large.

Under such a background, there is an increasing demand of manufacturing a flat container by the stretch blow molding method even when the flat container has a shape that is relatively difficult to process. For example, JP 5567310 B2 proposes a method for pre-blowing a preform in parallel with a mold clamping step of a blow molding mold in a blow molding method of manufacturing a flat container by a biaxial stretching blow method.

In the manufacturing of the flat container, since a stretching ratio of preform is different between a container short diameter side and a container long diameter side, an uneven thickness of the container tends to be large. Usually, an uneven thickness of the container can be suppressed to some extent by adjusting a temperature distribution and a thickness distribution of the preform. However, in a highly flat container in which the short diameter side is hardly stretched and the long diameter side is mainly stretched, the uneven thickness cannot be eliminated even by the above means, and an elongated columnar thick portion is formed in a short diameter side body portion of the container, so that appearance defects are likely to occur.

In addition, when free blowing is performed in a space between split molds in an opened state in a blow-molding unit as in JP 5567310 B2, control at the time of blow molding becomes complicated, and it is difficult to stabilize the shape and the like of the preform after free blowing. Therefore, there is still room for improvement in stably manufacturing a flat container having a good appearance.

SUMMARY OF THE INVENTION

One aspect of the present invention provides a method of manufacturing a resin container having a flat cross-sectional shape, the method including a temperature adjusting step and a blow molding step. In the temperature adjusting step, a resin preform is preliminarily blown in the first mold to mold an intermediate molded body having a diameter larger than a diameter of a container short diameter side, and a temperature of the intermediate molded body is adjusted in the first mold. In the blow molding step, the temperature-adjusted intermediate molded body is brought into contact with a second mold to be compressed in a container short diameter direction, and then the intermediate molded body is stretched and blow-molded in the second mold to manufacture the resin container.

Further features of the present invention will become apparent from the following description of exemplary embodiments with reference to the attached drawings.

DESCRIPTION OF THE EMBODIMENTS

Figure 1:
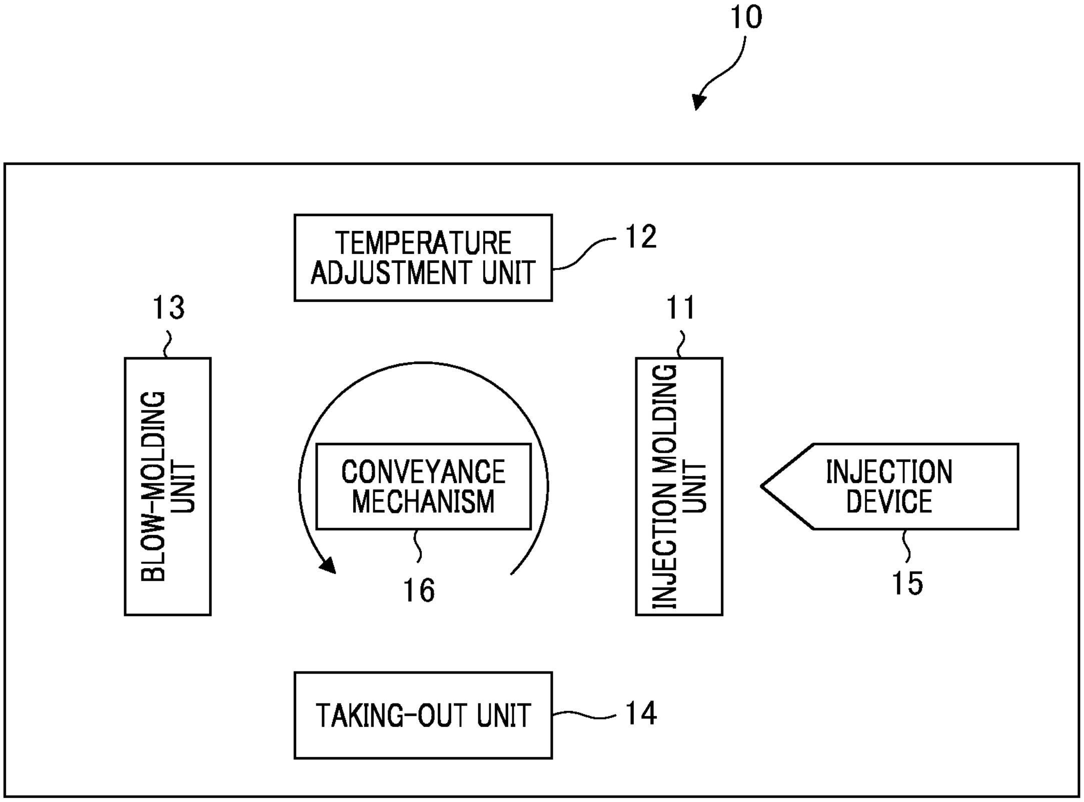
FIG. 1 is a diagram schematically illustrating a configuration of a blow-molding apparatus according to the present embodiment.

Hereinafter, embodiments of the present invention will be described with reference to the drawings.

In the embodiments, for easy understanding, structures and elements other than the main portion of the present invention will be described in a simplified or omitted manner. In the drawings, the same elements are denoted by the same reference numerals. Note that the shapes, dimensions, and the like of the respective elements illustrated in the drawings are schematically illustrated, and do not indicate actual shapes, dimensions, and the like.

<Description of Blow-Molding Apparatus>

First, a blow-molding apparatus 10 of manufacturing a flat-shaped container will be described with reference to FIG. 1. FIG. 1 is a block diagram schematically illustrating a configuration of the blow-molding apparatus 10. The blow-molding apparatus 10 according to the present embodiment is a hot-parison type (also referred to as a one-stage type or a one-step type) apparatus that performs blow-molding by utilizing residual heat (internal heat) from injection molding without cooling the preform 1 to room temperature.

The blow-molding apparatus 10 includes an injection molding unit 11, a temperature adjustment unit 12, a blow-molding unit 13, a taking-out unit 14, and a conveyance mechanism 16. The injection molding unit 11, the temperature adjustment unit 12, the blow-molding unit 13, and the taking-out unit 14 are disposed at positions rotated by a predetermined angle (for example, 90 degrees) around the conveyance mechanism 16.

(Conveyance Mechanism 16)

The conveyance mechanism 16 includes a transfer plate (not illustrated) that moves to rotate about an axis in a direction perpendicular to the paper surface of FIG. 1. In the transfer plate, one or more neck molds 17 (not illustrated in FIG. 1) for holding a neck portion of the preform 1 (alternatively, an intermediate molded body 2 or a container 3 to be described later) are arranged at predetermined angles.

The conveyance mechanism 16 conveys the preform 1 and the like having the neck portion held by the neck mold 17 in the order of the injection molding unit 11, the temperature adjustment unit 12, the blow-molding unit 13, and the taking-out unit 14 by moving the transfer plate by 90 degrees. Note that the conveyance mechanism 16 further includes a lifting/lowering mechanism (vertical mold opening/closing mechanism) and a mold opening mechanism of the neck mold 17, and also performs an operation of lifting and lowering the transfer plate and an operation related to mold closing and mold opening (mold release) in the injection molding unit 11 and the like.

(Injection Molding Unit 11)

The injection molding unit 11 includes an injection cavity mold, an injection core mold, and a hot runner mold (all not illustrated), and manufactures the preform 1 by injection molding. An injection device 15 that supplies a molten resin material as a raw material of the preform 1 is connected to the injection molding unit 11.

In the injection molding unit 11, the injection cavity mold, the injection core mold, and the neck mold 17 of the conveyance mechanism 16 conveyed at the time of molding are closed to form a preform-shaped mold space. Then, the resin material is poured into the mold space from the injection device 15 through a hot runner mold, whereby the preform 1 is manufactured by the injection molding unit 11.

Figure 2:
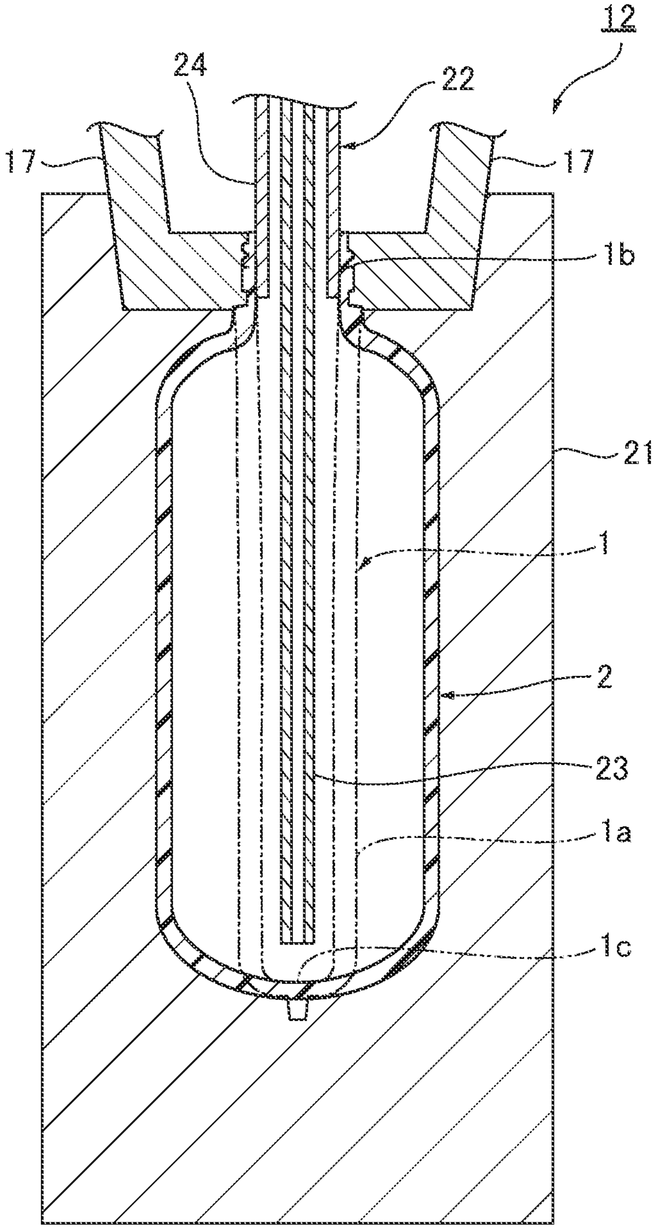
FIG. 2 is a longitudinal sectional view illustrating a configuration example of a temperature adjustment unit.

Here, the entire shape of the preform 1 is a bottomed cylindrical shape in which one end side is opened and the other end side is closed as indicated by two-dot chain lines in FIG. 2. The preform 1 includes a body portion 1*a* formed in a cylindrical shape, a bottom portion 1*c* that closes the other end side of the body portion 1*a*, and a neck portion 1*b* formed in an opening on one end side of the body portion 1*a*. Further, as indicated by two-dot chain lines in FIG. 3, the cross-sectional shape of the preform 1 is circular. When an outer shape of a cross section at the body portion of the preform 1 is circular (perfect circular), a wall thickness (thickness) of a body portion 1*a* corresponding to a long diameter side of the container 3 to be described later is preferably set thicker than the thickness of the body portion 1*a* corresponding to a short diameter side of the container 3 (1.05 to 1.20 times, preferably 1.10 to 1.15 times the wall thickness of the body portion corresponding to the short diameter side).

The cross section of the preform 1 may have an elliptical shape or a flat shape. When the outer shape of the cross section at the body portion of the preform 1 is an elliptical shape or a flat shape, the long diameter side and the short diameter side of the body portion of the preform 1 correspond to the long diameter side and the short diameter side of the container 3 described later, respectively. Preferably, the dimension (outer diameter) in the long-diameter-side of the body portion of the preform 1 is 1.05 to 1.10 times the dimension (outer diameter) in the short-diameter-side, and the long diameter side wall thickness of the body portion is set thicker than the short diameter side wall thickness (for example, 1.05 to 1.20 times, preferably 1.10 to 1.15 times).

The material of the preform 1 is a thermoplastic synthetic resin, and can be appropriately selected according to the use of the container. For example, specific examples of the material include PET (polyethylene terephthalate), PEN (polyethylene naphthalate), PCTA (polycyclohexanedimethylene terephthalate), Tritan (Tritan (registered trademark): co-polyester manufactured by Eastman Chemical Co., Ltd.), PP (polypropylene), PE (polyethylene), PC (polycarbonate), PES (polyethersulfone), PPSU (polyphenylsulfone), PS (polystyrene), COP/COC (cyclic olefin polymer), PMMA (polymethyl methacrylate: acrylic), and PLA (polylactic acid), for example.

Even when the molds of injection molding unit 11 are opened, the preform 1 is held and conveyed as it is without releasing the neck mold 17 of the conveyance mechanism 16. The number (that is, the number of containers that can be simultaneously molded by the blow-molding apparatus 10) of the preforms 1 simultaneously molded by the injection molding unit 11 can be appropriately set.

(Temperature Adjustment Unit 12)

The temperature adjustment unit 12 preliminarily blows the preform 1 manufactured by the injection molding unit 11 to mold the bottomed cylindrical intermediate molded body 2 having a body portion larger in diameter than the preform 1. The temperature adjustment unit 12 performs temperature equalization and removal of temperature deviation of the intermediate molded body 2, and adjusts the temperature of the intermediate molded body 2 so as to have a temperature (for example, about 90° C. to 105° C.) suitable for blow molding and a temperature distribution suitable for a container shape to be shaped. The temperature adjustment unit 12 also has a function of cooling the intermediate molded body 2 molded from the preform 1 in a high temperature state after the injection molding.

Figure 3:
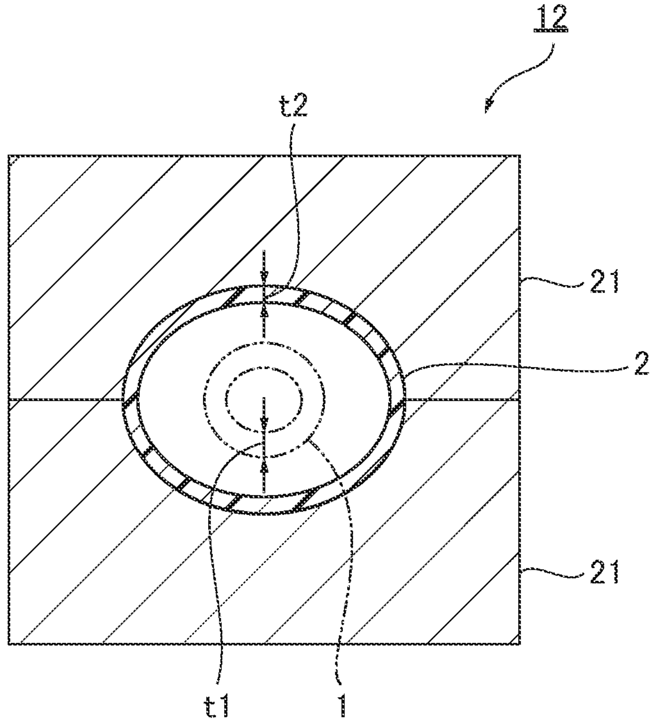
FIG. 3 is a transverse sectional view of FIG. 2.

FIG. 2 is a longitudinal sectional view illustrating a configuration example of the temperature adjustment unit 12, and FIG. 3 is a transverse sectional view of FIG. 2. The temperature adjustment unit 12 includes a cavity mold (temperature adjustment pot) 21 capable of accommodating the preform 1 and an air introduction/discharge member 22 as a mold unit for temperature adjustment.

The cavity mold 21 is a pair of split molds capable of accommodating the preform 1 therein, and has a mold space corresponding to the shape of the intermediate molded body 2. The cavity mold 21 is divided by a parting plane along a left-right direction in FIG. 3, and is configured to be openable and closable in a vertical direction in FIG. 3.

As illustrated in FIG. 2, an axial length (axial length of the intermediate molded body 2) of the mold space of the cavity mold 21 is substantially the same as an axial length (excluding a length of a gate portion) of the body portion of the preform 1. For example, the axial length of the mold space of the cavity mold 21 is set to, for example, 1.0 to 1.1 times the axial length of the body portion of the preform 1. As illustrated in FIG. 3, the cross-sectional shape (the cross-sectional shape of the intermediate molded body 2) of the mold space of the cavity mold 21 is an elliptical shape having a longer dimension in the left-right direction (long diameter direction) in the drawing than dimension in the vertical direction (short diameter direction) in the drawing. The dimension in the short diameter direction and the dimension in the long diameter direction of the mold space are both set to be larger than the outer diameter of the preform 1. Further, the dimension of the mold space in the short diameter direction is set to be larger than a dimension L1 of the container body in short-diameter-side described later.

For example, the dimension (outer diameter) in the short diameter and dimension (outer diameter) in the long diameter of the mold space of the cavity mold 21 are set to 1.3 times to 2.5 times, preferably 1.5 times to 2.0 times the outer diameter of the body portion of the preform 1. Therefore, the intermediate molded body 2 is stretched by blowing preliminarily so that the outer diameter of the body portion of the intermediate molded body 2 is 1.3 times to 2.5 times or less, preferably 1.5 times to 2.0 times or less the outer diameter of the body portion of the preform 1. The short diameter dimension of the mold space is preferably set to 1.3 times or less (for example, 1.1 times to 1.2 times) the short diameter dimension L1 of the container.

A flow path (not illustrated) through which a temperature control medium (refrigerant) flows is formed inside the cavity mold 21. Therefore, the temperature of the cavity mold 21 is maintained at a predetermined temperature by the temperature control medium. The temperature of the temperature control medium of the cavity mold 21 is not particularly limited, but can be appropriately selected within a range of, for example, 5° C. to 80° C., preferably 30° C. to 60° C.

The air introduction/discharge member 22 has at least a fitting core 24 connected to an air supply unit (not illustrated), and is inserted into the neck mold 17 and the preform 1. The fitting core 24 (air introduction/discharge member 22) is airtightly brought into contact with the neck portion 1*b* of the preform 1 in a state of being inserted into the neck mold 17. An opening for supplying (or exhausting) compressed air into the preform 1 is formed at a distal end of the fitting core 24.

The air introduction/discharge member 22 may further include an air introduction/discharge rod 23 connected to the air supply unit (not illustrated). The inside of the air introduction/discharge rod 23 constitutes a flow path for guiding the compressed air (air and gaseous refrigerant) from the air supply unit, and the distal end of the air introduction/discharge rod 23 is inserted to the vicinity of a bottom portion 1*c* of the preform 1. An opening for supplying (or exhausting) the compressed air into the preform 1 is formed at the distal end of the air introduction/discharge rod 23.

The fitting core 24 is in close contact with the inner periphery or the upper end surface of the neck portion 1*b* when the air introduction/discharge rod 23 is inserted into the neck mold 17, and maintains airtightness between the preform 1 and the air introduction/discharge member 22. The distal end of the fitting core 24 is inserted or abutted to the position of the neck portion 1*b* of the preform 1. A space between the air introduction/discharge rod 23 and the fitting core 24 constitutes an exhaust (or supply) flow path connected to an air exhaust unit (not illustrated). The fitting core 24 and the air introduction/discharge rod 23 are both hollow cylindrical bodies, and the air introduction/discharge rod 23 is concentrically disposed inside the fitting core 24.

(Blow-Molding Unit 13)

The blow-molding unit 13 performs biaxial stretching blow molding on the intermediate molded body 2 conveyed from the temperature adjustment unit 12 to manufacture the container 3. The blow-molding unit 13 includes a blow cavity mold 31, a bottom mold 32, a stretching rod 34, and a second air introduction/discharge member 33.

Figure 4:
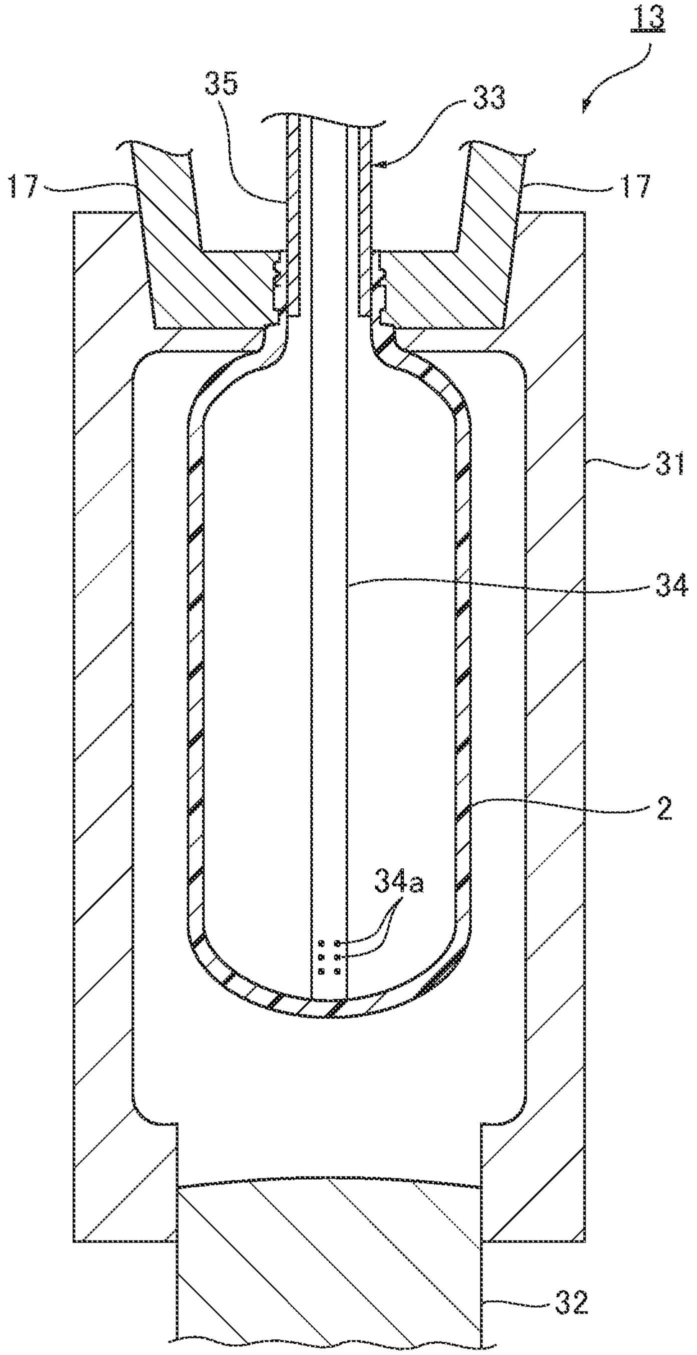
FIG. 4 is a longitudinal sectional view illustrating a configuration example of a blow-molding unit.
Figure 5:
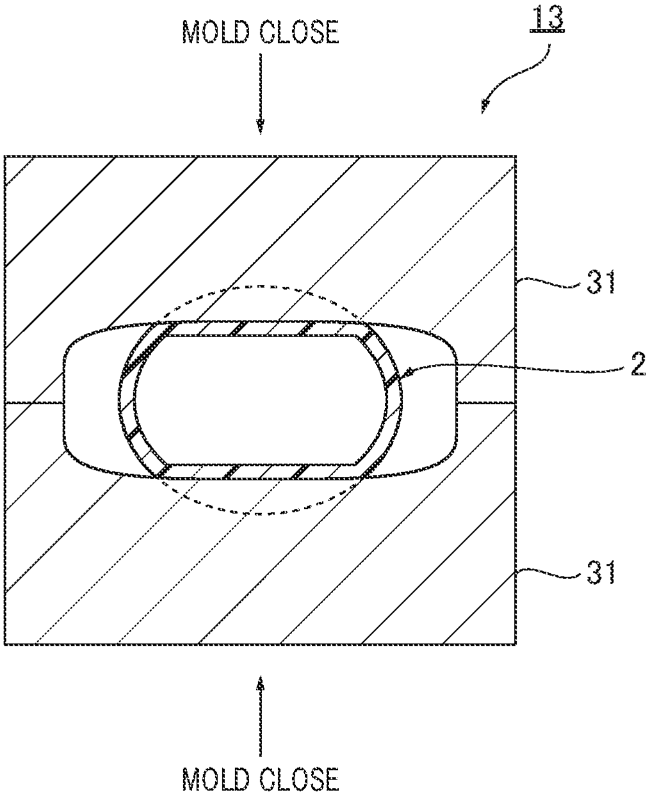
FIG. 5 is a transverse sectional view of FIG. 4.
Figure 6:
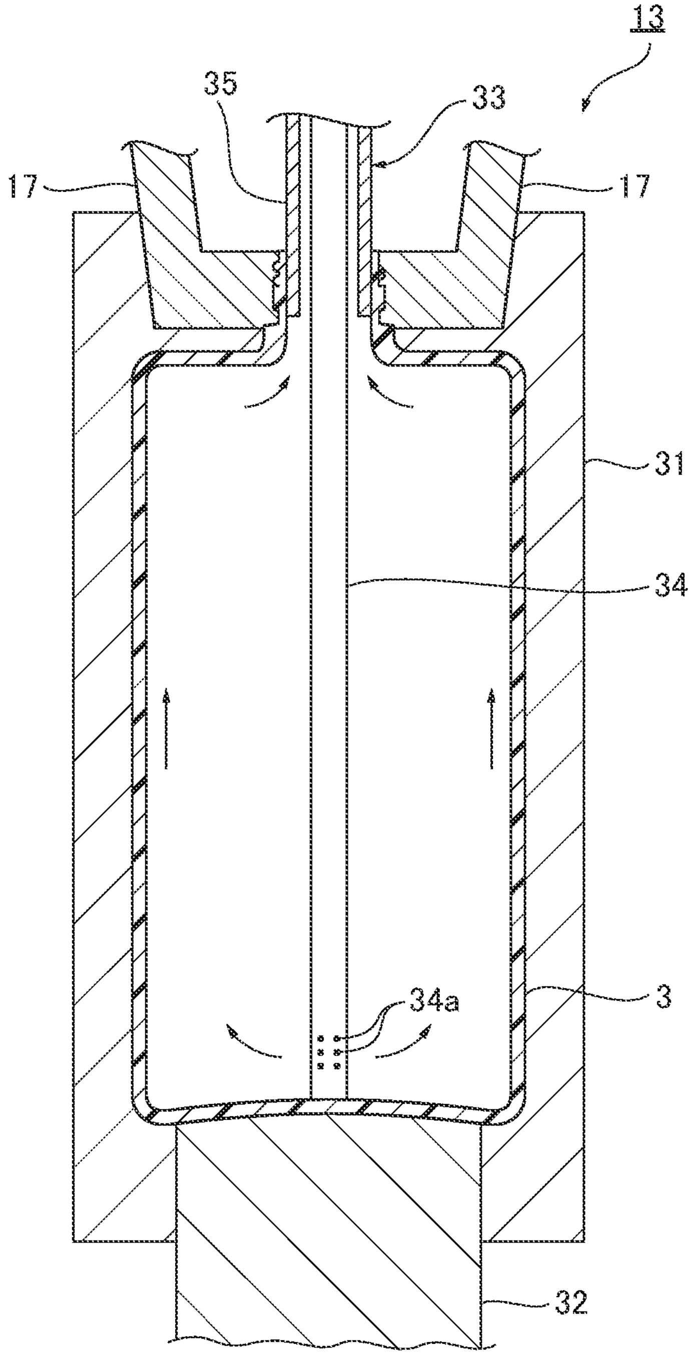
FIG. 6 is a longitudinal sectional view illustrating a state of the blow-molding unit during blow molding.

FIG. 4 is a longitudinal sectional view illustrating a configuration example of the blow-molding unit 13, and FIG. 5 is a transverse sectional view of FIG. 4. FIG. 6 is a longitudinal sectional view illustrating a state of the blow-molding unit 13 during blow molding, and FIG. 7 is a transverse sectional view of FIG. 6.

The blow cavity mold 31 is a pair of split molds capable of accommodating the intermediate molded body 2 therein, and defines the shape of the container 3 excluding the bottom surface. The blow cavity mold 31 is divided by a parting plane along the left-right direction in FIG. 5 or 7, and is configured to be openable and closable in the up-down direction in FIG. 5 or 7.

Figure 7:
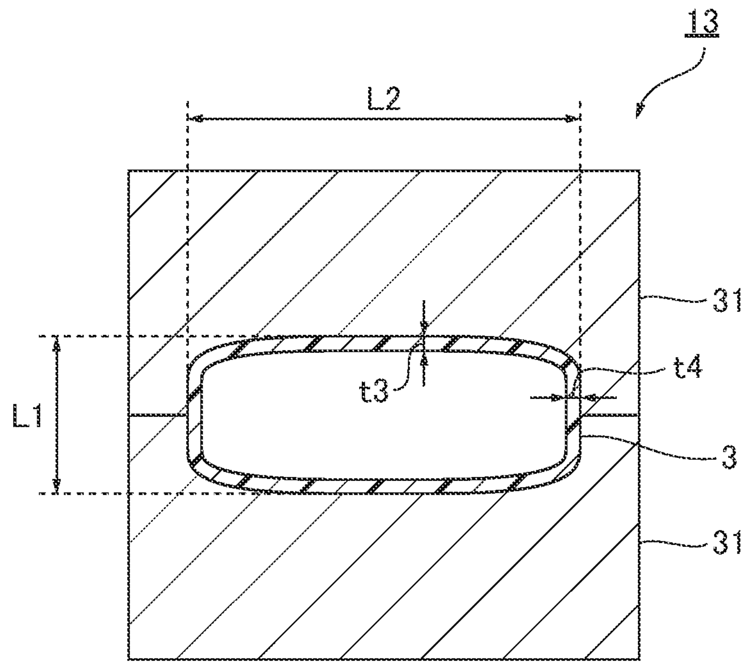
FIG. 7 is a transverse sectional view of FIG. 6.

As illustrated in FIGS. 5 and 7, the cross-sectional shape (the cross-sectional shape of the container 3) of the mold space of the blow cavity mold 31 is a flat rectangular shape in which a dimension L2 in the left-right direction (long diameter direction) in the drawing is longer than a dimension L1 in the vertical direction (short diameter direction) in the drawing. Here, the dimension L1 of the mold space of the blow cavity mold 31 in the short-diameter direction is set shorter than the dimension of the intermediate molded body 2 in the short diameter direction. The dimension L2 of the mold space of the blow cavity mold 31 in the long diameter direction is set to be larger than the dimension of the intermediate molded body 2 in the long diameter direction.

For example, the container 3 of the present embodiment is a container having a highly flat cross-sectional shape. In the container 3, the dimension (L1) of the container body in the short-diameter-side with respect to the outer diameter of the container neck is set to 1.7 times or less (preferably 1.1 to 1.5 times, more preferably 1.2 to 1.4 times), and the dimension (L2) of the container body in the long-diameter-side is set to 5 times or less (preferably 3 to 4.5 times, more preferably 3.5 to 4 times). In the container 3, the dimension (L2) of the container body in the long-diameter-side is set to 1.5 times or more (preferably 2 to 4 times, more preferably 2.5 to 3 times) the dimension (L1) of the container body in the short-diameter-side. It is desirable to set the temperature of the blow cavity mold 31 at the time of blow molding to, for example, 30° C. or less by forming a flow path (not illustrated) through which a cooling medium flows also inside the blow cavity mold 31. The length of the blow cavity mold in a vertical axis direction is set to 1.0 to 1.2 times, preferably 1.0 to 1.1 times the length of the preform 1 or the intermediate molded body 2 in the vertical axis direction, and is preferably substantially the same as the length of the intermediate molded body 2 or the preform 1.

As illustrated in FIG. 6, the bottom mold 32 is a mold material that is disposed at the lower side of the blow cavity mold 31 and defines the shape of the bottom surface of the container 3. The bottom mold 32 is configured to be movable forward and backward in the vertical direction. When the blow cavity mold 31 and the bottom mold 32 are closed, a mold space defining the shape of the container 3 is formed. By forming a flow path (not illustrated) through which a cooling medium flows also inside the bottom mold 32, the temperature of the bottom mold 32 at the time of blow molding is desirably set to, for example, 30° C. or lower.

The second air introduction/discharge member 33 has at least a second fitting core 35 connected to an air supply unit (not illustrated) and an air exhaust unit (not illustrated), and is inserted into the neck mold 17 and the intermediate molded body 2. The second air introduction/discharge member 33 is airtightly brought into contact with the neck portion of the intermediate molded body 2 in a state of being inserted into the neck mold 17.

The stretching rod 34 is configured to be movable forward and backward in the vertical direction in the drawing with respect to the second fitting core 35. The stretching rod 34 brings the distal end into contact with the inner bottom surface of the intermediate molded body 2 to perform longitudinal axis stretching of the intermediate molded body 2.

Note that a flow path for introducing blow air from an air supply unit (not illustrated) may be provided inside the stretching rod 34 as necessary. In this case, a plurality of openings 34*a* for injecting blow air into the intermediate molded body 2 or the container 3 is formed on the peripheral surface in the vicinity of the distal end of the stretching rod 34.

The second fitting core 35 is in close contact with the inner periphery or the upper end surface of the neck portion of the intermediate molded body 2 when the stretching rod 34 is inserted into the neck mold 17, and maintains airtightness between the intermediate molded body 2 and the second air introduction/discharge member 33. The distal end of the second fitting core 35 is inserted or abutted to the position of the neck portion of the intermediate molded body 2. An opening for supplying air to the intermediate molded body 2 and exhausting compressed air (air) from the container 3 is formed at the distal end of the second fitting core 35. The stretching rod 34 and the second fitting core 35 are both hollow cylindrical bodies, and the stretching rod 34 is disposed concentrically inside the second fitting core 35. When the air flow path is formed in the stretching rod 34, the space between the stretching rod 34 and the fitting core 35 constitutes an exhaust flow path connected to an air exhaust unit (not illustrated).

(Taking-Out Unit 14)

The taking-out unit 14 is configured to release the neck portion of the container manufactured by the blow-molding unit 13 from the neck mold 17 and take out the container to the outside of the blow-molding apparatus 10.

<Description of Blow Molding Method>

Next, a blow molding method by the blow-molding apparatus 10 of the present embodiment will be described.

Figure 8:
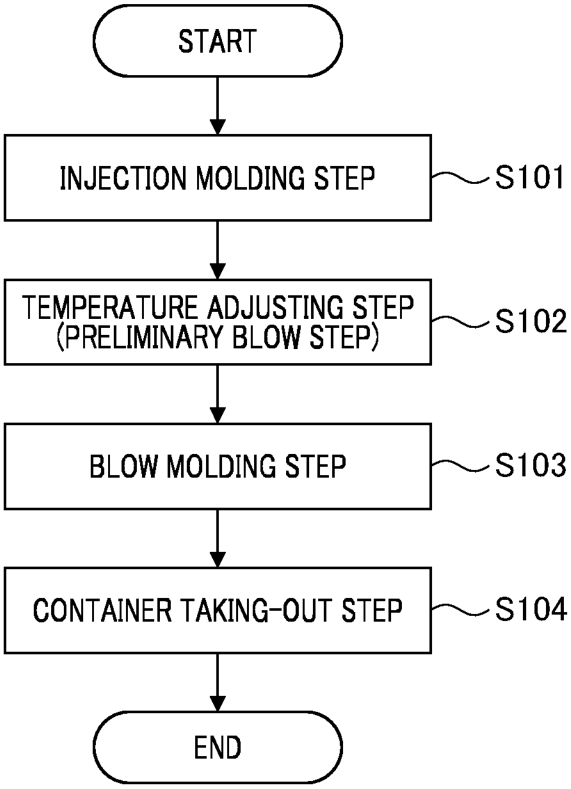
FIG. 8 is a flowchart illustrating steps of a blow molding method of the present embodiment.

FIG. 8 is a flowchart illustrating steps of the blow molding method.

(Step S101: Injection Molding Step)

First, in the injection molding unit 11, a molten resin is injected from the injection device 15 into the preform-shaped mold space formed by the injection cavity mold, the injection core mold, and the neck mold 17 of the conveyance mechanism 16 to manufacture the preform 1. Then, after the molds of injection molding unit 11 are opened, the transfer plate of the conveyance mechanism 16 moves so as to rotate by a predetermined angle. As a result, the preform 1 held in the neck mold 17 is conveyed to the temperature adjustment unit 12 in a state of having residual heat from injection molding.

Although not particularly limited, in the injection molding step, the cooling step in the injection mold of the preform 1 may be omitted or shortened and the preform 1 may be carried out to the next step so as to open the injection mold and release the preform 1 in a high temperature state after completion of filling and pressure holding of the resin material. This reduces the injection molding time, which is the rate-determining step, allowing the container to be manufactured with a fast molding cycle.

For example, a set value (parameter) of injection molding conditions of the blow-molding apparatus 10 is set such that a ratio of a cooling time (time from after the pressure holding to before the mold opening) to an injection time (time from filling to pressure holding) is ½ or less, preferably ⅓ or less, and more preferably ¼ or less. The cooling time may be set to 0 second.

(Step S102: Temperature Adjusting Step)

Subsequently, the preform 1 is preliminarily blown and the temperature of the preform 1 is adjusted in the temperature adjustment unit 12. First, in the temperature adjustment unit 12, as illustrated in FIG. 2, the preform 1 is accommodated in the cavity mold 21. Subsequently, the air introduction/discharge member 22 is inserted into the neck portion of the preform 1 accommodated in the cavity mold 21. In this case, the neck portion of the preform 1 and the fitting core 24 are brought into close contact with each other to maintain airtightness therebetween.

Thereafter, the preliminary blowing of the preform 1 is performed. In the preliminary blowing of the present embodiment, for example, compressed air is introduced into the preform 1 from the fitting core 24, and the compressed air is exhausted from the fitting core 24.

In the preform 1 into which the compressed air has been introduced by the preliminary blowing, the body portion 1*a* bulges so as to be in close contact with the mold space of the cavity mold 21, and is shaped into the shape of the intermediate molded body 2. Since the intermediate molded body 2 is formed by laterally axially stretching the preform 1, the thickness t2 of the intermediate molded body 2 on the short diameter side is smaller than the thickness of the preform 1 on the short diameter side (t1>t2). In addition, it is preferable that the body portion of the intermediate molded body 2 is stretched by the preliminary blowing such that the thickness of the body portion is uniform in the circumferential direction, and the body portion of the intermediate molded body 2 is stretched such that the thickness of a portion corresponding to the long diameter side and the short diameter side of the container 3 is 1:1.

The intermediate molded body 2 in the temperature adjustment unit 12 continues to be in contact with the cavity mold 21 kept at a predetermined temperature until the compressed air is exhausted. Therefore, in the temperature adjustment unit 12, the temperature of the intermediate molded body 2 is regulated so as not to be equal to or lower than a temperature suitable for blow molding from the outside, and the unevenness temperature generated from injection molding is also reduced. Since the shape of the intermediate molded body 2 is defined by the cavity mold 21, the shape does not greatly vary from one manufacturing cycle to another.

The temperature adjustment unit 12 may perform cool blow (cooling blow) for cooling the intermediate molded body 2 after preliminary blowing for shaping the preform 1 into the intermediate molded body 2. In the cooling blow, for example, compressed air is introduced from the air introduction/discharge rod 23 to the bottom portion side of the preform 1. Then, after the preform 1 is cooled from the inside by the circulation of the compressed air, the warmed compressed air is exhausted from the fitting core 24 on the neck portion side of the preform 1. When the cooling blow is performed by the temperature adjustment unit 12, the intermediate molded body 2 in a high-temperature state is rapidly cooled, so that whitening (cloudiness) due to spherulite formation crystallization that may occur when the intermediate molded body 2 is slowly cooled can be further suppressed, which is particularly effective in a molding method in which the preform 1 is demolded at a high temperature by the injection molding unit.

After the temperature adjusting step, the transfer plate of the conveyance mechanism 16 moves so as to rotate by a predetermined angle. As a result, the intermediate molded body 2 after temperature adjustment held in the neck mold 17 is conveyed to the blow-molding unit 13.

(Step S103: Blow Molding Step)

Subsequently, in the blow-molding unit 13, the flat container 3 is blow-molded.

First, the blow cavity mold 31 is closed, and the intermediate molded body 2 is accommodated in the mold space (see FIG. 5). As described above, the dimension L1 of the mold space of the blow cavity mold 31 in the short diameter direction is shorter than the dimension of the intermediate molded body 2 in the short diameter direction, and the dimension L2 of the mold space of the blow cavity mold 31 in the long diameter direction is longer than the dimension of the intermediate molded body 2 in the long diameter direction.

Therefore, the intermediate molded body 2 accommodated in the blow cavity mold 31 is compressed in the short diameter direction and comes into contact with the surface on the short diameter side (surface extending in the long diameter direction) of the blow cavity mold 31. Meanwhile, a gap is formed between the blow cavity mold 31 and the intermediate molded body 2 in the long diameter direction of the intermediate molded body 2. Since the short-diameter-side surface (surface extending in the long diameter direction) of the intermediate molded body 2 is first brought into contact with the blow cavity mold 31 and cooled, the long-diameter-side surface (surface extending in the short diameter direction) of the intermediate molded body 2 is likely to be stretched during the blow molding.

Next, as illustrated in FIG. 4, by lowering the second air introduction/discharge member 33, the second fitting core 35 is brought into contact with the neck portion of the intermediate molded body 2. Then, while the stretching rod 34 is lowered to hold the bottom portion of the intermediate molded body 2 from the inner surface to perform longitudinal axis stretching, blow air is supplied via the second fitting core 35 to laterally axially stretch the intermediate molded body 2. It is preferable that the intermediate molded body 2 is laterally axially stretched 1.5 times to 3 times, preferably 1.8 times to 2.5 times in the direction of the long diameter side of the container 3. It is preferable that the intermediate molded body 2 is not substantially stretched in the vertical axis direction.

As a result, as illustrated in FIGS. 6 and 7, the intermediate molded body 2 is expanded and shaped so as to be in close contact with the mold space of the blow cavity mold 31, and is blow-molded in the container 3. The bottom mold 32 is controlled so as to stand by at a lower position not in contact with the bottom portion of the intermediate molded body 2 before closing the blow cavity mold 31 and to quickly ascend to the molding position before closing the mold or after closing the mold. After the blow molding described above, blow air (compressed air) may be discharged from the second fitting core 35 while being supplied into the container 3 from the distal end of the stretching rod 34 to be circulated as necessary, and the cooling efficiency of the container 3 may be increased.

(Step S104: Container Taking-Out Step)

When the blow molding is completed, the blow cavity mold 31 and the bottom mold 32 are opened. As a result, the container 3 is movable from the blow-molding unit 13.

Subsequently, the transfer plate of the conveyance mechanism 16 moves so as to rotate by a predetermined angle, and the container 3 is transported to the taking-out unit 14. In the taking-out unit 14, the neck portion of the container 3 is released from the neck mold 17, and the container 3 is taken out to the outside of the blow-molding apparatus 10.

Thus, the series of steps of the blow molding method is completed. Thereafter, by moving the transfer plate of the conveyance mechanism 16 so as to rotate by a predetermined angle, the respective steps of S101 to S104 described above are repeated. During operation of the blow-molding apparatus 10, four sets of containers having a time difference of one step are manufactured in parallel.

Note that, due to the structure of the blow-molding apparatus 10, the time during which the transfer plate is stopped in each of the injection molding unit 11, the temperature adjustment unit 12, the blow-molding unit 13, and the taking-out unit 14 is the same. Similarly, the conveyance time of the transfer plate between the units is the same.

Hereinafter, operational effects of the present embodiment will be described.

In the temperature adjusting step (S102) of the present embodiment, the preform 1 is preliminarily blown by the cavity mold 21 to mold the intermediate molded body 2 having a larger diameter than the short diameter side of the container and a smaller diameter than the long diameter side of the container, and the temperature of the intermediate molded body 2 is adjusted in the cavity mold 21. In the blow molding step (S103), the intermediate molded body 2 whose temperature has been adjusted is brought into contact with the blow cavity mold 31 and compressed in the direction of the short diameter of the container, and then the intermediate molded body 2 is stretched and blow-molded in the blow cavity mold 31 to manufacture the flat container 3.

In the blow molding step, the surface on the short diameter side (surface extending in the long diameter direction) of the intermediate molded body 2 first comes into contact with the blow cavity mold 31 and is cooled, so that the surface on the long diameter side (surface extending in the short diameter direction) of the intermediate molded body 2 is mainly stretched. However, since the preform 1 is preliminarily blown in the temperature adjusting step, the thickness t2 of the laterally axially stretched intermediate molded body 2 on the short diameter side is smaller than the thickness t1 of the preform 1 on the short diameter side. Therefore, the thickness t3 on the short diameter side of the container 3 obtained by blow molding the intermediate molded body 2 also becomes thin, and becomes a value close to the thickness t4 on the long diameter side of the container 3. As described above, according to the present embodiment, it is possible to suppress the forming of the elongated columnar thick portion in the short diameter side body portion of the flat container 3 and to manufacture the flat container 3 having a good appearance.

In addition, by setting the dimension of the intermediate molded body 2 on the short diameter side to the value (1.3 times or less, preferably 1.1 times to 1.2 times) close to the dimension of the container 3 on the short diameter side, the contact area when the intermediate molded body 2 is compressed by the blow cavity mold 31 can be reduced, and the cooling area can be reduced. This makes it possible to suppress forming of a columnar thick portion in the container 3. The preform 1 is preliminarily blown so that the thickness of the intermediate molded body 2 is substantially equal to t2 in the circumferential direction in the temperature adjustment unit/temperature adjusting step, whereby the intermediate molded body 1 is stretched so that the thickness of the portion corresponding to the long diameter side and the short diameter side of the container 3 is substantially 1:1. This also suppresses the forming of the columnar thick portion in the container 3.

Further, when the axial lengths of the preform 1 or the intermediate molded body 2 and the container 3 are set to be substantially the same, in the blow molding step, the longitudinal axis stretching of the intermediate molded body 2 is suppressed, and only the stretching in the substantially lateral axis (outer diameter) direction is performed. Therefore, the position where the intermediate molded body 2 is inflated with the compressed air (air) and comes into contact with the blow cavity mold 31 first can be moved to the lower side (bottom portion side) of the container 3, and the contact mark formed on the container 3 can be made inconspicuous. In the blow molding step, since only stretching is performed substantially in the lateral axis (outer diameter) direction, the thickness distribution in the vertical direction of the container 3 is improved, and the shapability of the diagonal region of the container bottom portion having a large degree of stretching can also be improved.

In the present embodiment, the preform 1 is preliminarily blown by the cavity mold 21 in the temperature adjusting step to mold the intermediate molded body 2. Therefore, for example, since the shape of the intermediate molded body 2 can be held with high accuracy as compared with the case where free blowing is performed in the space between the blow split molds in the opened state, the flat container 3 having a favorable shape can be stably manufactured.

Further, in the present embodiment, since the intermediate molded body 2 is molded in the temperature adjusting step which is a previous step of the blow molding step, the temperature of the intermediate molded body 2 can be easily adjusted as compared with the case where the free blow is performed in the blow split mold in the opened state. Therefore, it is possible to further improve the yield of the flat container 3 by adjusting the temperature deviation of the intermediate molded body 2 or imparting a preferable temperature distribution to the intermediate molded body 2 before blow molding.

The present invention is not limited to the above embodiments, and various improvements and design changes may be made without departing from the gist of the present invention.

In the above embodiment, the hot parison type four-station type apparatus configuration has been described as an example of the blow-molding apparatus. However, the blow-molding device of the present invention is not limited to the above embodiment, and can be applied to the manufacturing of the flat container by another blow-molding apparatus as long as the apparatus includes the temperature adjustment unit and the blow-molding unit. For example, the configuration of the present invention may be applied to a hot parison type five-station type or six-station type blow-molding apparatus. Furthermore, the present invention may be applied to a hot parison type three-station type blow-molding apparatus including the injection molding unit, the blow-molding unit 13, and the taking-out unit. In this case, the preliminary blowing may be performed by, for example, a method of inserting a temperature adjustment cavity mold between the blow split molds in the opened state in the blow-molding unit.

Figure 9:
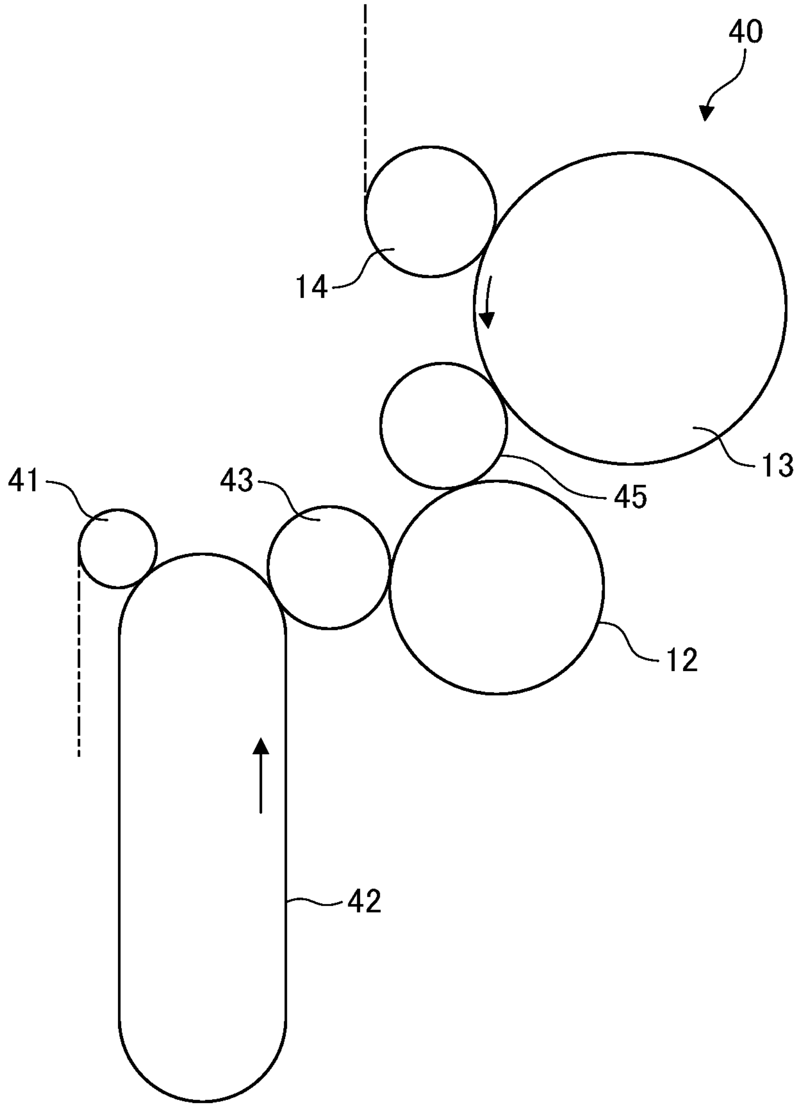
FIG. 9 is a diagram schematically illustrating a configuration of a blow-molding apparatus according to another embodiment.

In addition, the configuration of the present invention may be applied to a cold parison type blow-molding apparatus having no injection molding unit. FIG. 9 is a diagram illustrating a configuration example of a cold parison type blow-molding apparatus 40.

The blow-molding apparatus 40 is configured to sequentially deliver the preform 1 and the like to a processing unit at a subsequent stage by rotary conveyance. The blow-molding apparatus 40 includes a preform supply unit 41, a heating unit 42, a transfer unit 43, a temperature adjustment unit 12, a transfer unit 45, a blow-molding unit 13, and a taking-out unit 14. The transfer units 43 and 45 may be omitted.

Note that the functions of the temperature adjustment unit 12, the blow-molding unit 13, and the taking-out unit 14 in FIG. 9 are similar to those in FIG. 1 of the above embodiment, and thus redundant description will be omitted.

The preform supply unit 41 supplies the preform 1 at room temperature prepared in advance to the heating unit 42. The heating unit 42 heats the preform 1 supplied from the preform supply unit 41 from room temperature to a temperature suitable for blow molding during rotation-conveyance. Thereafter, the heated preform 1 is transferred to the temperature adjustment unit 12 via the transfer unit 43, and preliminary blowing and temperature adjustment are performed in the temperature adjustment unit 12.

The intermediate molded body 2 molded by the preliminary blowing of the temperature adjustment unit 12 is delivered to the blow-molding unit 13 via the transfer unit 45, and shaped into the flat container 3 by the blow-molding unit 13. Thereafter, the container 3 is delivered to the taking-out unit 14 and carried out.

Moreover, with the configuration of FIG. 9, a flat container having a good appearance can be stably manufactured as in the above embodiment.

In addition, the embodiments disclosed herein are to be considered in all respects as illustrative and not restrictive. The scope of the present invention is indicated not by the above description but by the claims, and it is intended that meanings equivalent to the claims and all modifications within the scope are included.

The invention claimed is:

1. A method of manufacturing a resin container having a flat cross- sectional shape, the method comprising:

injection molding a resin preform;

preliminarily blowing resin preform having residual heat from injection molding in a first mold to mold an intermediate molded body having a diameter larger than a diameter of a short diameter side of a container, and performing a cooling blow for cooling the intermediate molded body after the preliminary blow to adjust a temperature of the intermediate molded body in the first mold as temperature adjusting; and bringing the temperature-adjusted intermediate molded body into contact with a second mold to compress the intermediate molded body in a direction of a short diameter of the container, and then stretching and blow molding the intermediate molded body in the second mold to manufacture the resin container as blow molding, wherein the blow molding is performed on the intermediate molded body that has been conveyed by a conveyance mechanism without being heated after the temperature adjusting, and in the injection molding, a ratio of a cooling time in an injection mold to a resin injection time is 1/2 or less.

2. The method of manufacturing a resin container according to claim 1, wherein in the temperature adjusting, the temperature of the intermediate molded body is adjusted by contact with the first mold.

3. The method of manufacturing a resin container according to claim 1, wherein in the resin container, a dimension of a container body in a short-diameter-side is 1.5 times or less a diameter of a container neck, and a dimension of the container body in a long-diameter-side is larger than 1.5 times the dimension of the container body in the short-diameter-side.

* * * * *